US009003399B2

(12) United States Patent
Bak et al.

(10) Patent No.: US 9,003,399 B2
(45) Date of Patent: Apr. 7, 2015

(54) METHODS, SYSTEMS AND COMPUTER PRODUCTS FOR A DYNAMIC REPOSITORY

(75) Inventors: Nathan V. Bak, Portland, OR (US); Patricia A. Gaughen, Portland, OR (US); Huizenga Gerrit, Portland, OR (US); Jon A. Grimm, Round Rock, TX (US); Donjuma S. Lee, Raleigh, NC (US); Eric B. Munson, Hillsboro, OR (US); Ramachandra N. Pai, Beaverton, OR (US); Timothy C. Pepper, Tigard, OR (US)

(73) Assignee: International Business Machines Corporation, Armonk, NY (US)

( * ) Notice: Subject to any disclaimer, the term of this patent is extended or adjusted under 35 U.S.C. 154(b) by 1720 days.

(21) Appl. No.: 11/853,407

(22) Filed: Sep. 11, 2007

(65) Prior Publication Data

US 2009/0070757 A1 Mar. 12, 2009

(51) Int. Cl.
*G06F 9/445* (2006.01)
*G06F 9/44* (2006.01)

(52) U.S. Cl.
CPC .... *G06F 8/60* (2013.01); *G06F 8/76* (2013.01)

(58) Field of Classification Search
CPC .............. G06F 8/60; G06F 8/61; G06F 8/63; G06F 8/65; G06F 8/67; G06F 8/68; G06F 8/71; G06F 9/4411; G06F 9/44505; H04L 29/08981
USPC ......................................................... 717/177
See application file for complete search history.

(56) References Cited

U.S. PATENT DOCUMENTS

| 5,701,472 A | * | 12/1997 | Koerber et al. .................. 1/1 |
| 5,835,777 A | * | 11/1998 | Staelin ........................... 717/175 |
| 5,960,204 A | * | 9/1999 | Yinger et al. .................. 717/176 |
| 6,112,181 A | * | 8/2000 | Shear et al. .................. 705/7.29 |
| 6,138,153 A | * | 10/2000 | Collins et al. .................. 709/221 |
| 6,675,382 B1 | * | 1/2004 | Foster ............................ 717/177 |
| 6,986,135 B2 | * | 1/2006 | Leathers et al. .............. 717/177 |

(Continued)

FOREIGN PATENT DOCUMENTS

WO   WO 2004/049115 A2 * 6/2004

OTHER PUBLICATIONS

Brown, Robert G., "YUM: Yellowdog Updater, Modified," Dec. 2003, p. 1-29.*

(Continued)

*Primary Examiner* — Qing Chen
*Assistant Examiner* — Andrew M Lyons
(74) *Attorney, Agent, or Firm* — Cantor Colburn LLP; Steven Bennett

(57) ABSTRACT

A software development service offering of generating and installing software applications packages on computer systems running a set of operating systems including LINUX and UNIX operating systems, by creating a dynamic repository; populating a plurality software packages; running a tool that creates a set of index files, wherein the set of index files includes a menu of the plurality of software packages, wherein each software package in the plurality of software packages contains a set of contents; determining whether a software package is included in a menu of the plurality of software packages; and delivering to a client system the software package requested in a selection request, or delivering to the client system an other software package, when the software package is not included in the menu of the plurality of software packages.

20 Claims, 2 Drawing Sheets

(56) References Cited

U.S. PATENT DOCUMENTS

| | | | | |
|---|---|---|---|---|
| 7,281,245 | B2* | 10/2007 | Reynar et al. | 717/173 |
| 7,735,080 | B2* | 6/2010 | Barturen et al. | 717/177 |
| 7,827,549 | B2* | 11/2010 | Tarassov | 717/174 |
| 8,589,866 | B2* | 11/2013 | Sekine et al. | 717/106 |
| 2003/0046681 | A1* | 3/2003 | Barturen et al. | 717/177 |
| 2004/0003389 | A1* | 1/2004 | Reynar et al. | 717/178 |
| 2004/0015831 | A1* | 1/2004 | Bowhill | 717/106 |
| 2006/0020937 | A1* | 1/2006 | Schaefer | 717/175 |
| 2006/0161605 | A1* | 7/2006 | Terazono et al. | 707/203 |
| 2006/0259904 | A1* | 11/2006 | Celli et al. | 717/174 |
| 2006/0265630 | A1* | 11/2006 | Alberti et al. | 714/38 |
| 2008/0127169 | A1* | 5/2008 | Malasky et al. | 717/174 |
| 2009/0064135 | A1* | 3/2009 | Jimmerson | 717/178 |

OTHER PUBLICATIONS

Ellis, Stuart, "Fedora Core 3 Software Management with yum," 2005, Red Hat, Inc., p. 1-18.*

* cited by examiner

METHODS, SYSTEMS AND COMPUTER PRODUCTS FOR A DYNAMIC REPOSITORY

TRADEMARKS

IBM® is a registered trademark of the International Business Machines Corporation, Armonk, N.Y., U.S.A. Other names used herein may be trademarks and registered trademarks, or trade or product names of International Business Machines Corporation or other companies.

TECHNICAL FIELD

The present invention relates generally to computer systems management software services and application solutions. More particularly, the present invention relates to efficiently creating software services and applications packages on demand for information technology (IT) solutions.

BACKGROUND

Yum/yast/apt repositories provide basic infrastructure to deploy software packages on Linux systems. The procedure for creating a repository requires populating the software packages and running a tool, which creates index files. These index files serve as menus for client systems to pick and choose the packages required on the client systems. The client systems can then request specific packages from the Yum/yast/apt repository and install those packages. However this approach restricts the client systems by requiring the clients to choose only the packages available in the index files menus. This basic infrastructure for deploying software packages on Linux systems precludes the client system from selecting software packages from a range of available and desirable software packages. Additionally, in this basic infrastructure for deploying software packages, software packages cannot be created from the Yum/yast/apt repositories on demand, even when the repositories have all of the content required for the software packages.

This basic infrastructure especially limits the creation of driver software packages. In most cases a driver software package built for one version of a kernel can be reused by a newer version of the kernel. Since it is impossible to determine from operating system (OS) vendors what all their future kernel versions will contain, then making available the driver packages for those future kernel versions is impossible. This motivates the need for a dynamic repository system.

Therefore, the need exists for a dynamic Yum/yast/apt repository infrastructure for deploying software packages on Linux systems.

Further, the need exists for a method and system of selecting, by client systems, software packages on demand, which are not restricted to predetermined menu selections.

In addition, the need exists for a method and system of creating software packages by reusing content from existing software packages.

SUMMARY OF THE INVENTION

A method and system of a computer systems software development service offering, by a provider computer processor, is disclosed herein. The computer systems software development offering method and system efficiently create software services and applications packages on demand for information technology (IT) solutions. Further, the computer systems software development offering method and system include providing, deploying and/or installing software packages on computer systems running a set of operating systems. The computer systems software development offering method and system perform the operations of creating, by the provider computer processor, a repository; populating a plurality software packages; and running a tool that creates a set of index files, where the set of index files can include a menu of the plurality of software packages, and where each software package in the plurality of software packages contains a plurality of content data. Further, the computer systems software development offering method and system perform the operations of receiving, from a client system, a selection request for a software package; determining whether the software package is included in the menu of the plurality of software packages; and performing either delivering to the client system the software package requested in the selection request, when the software package is included in the menu of the plurality of software packages or delivering to the client system an other software package, when the software package is not included in the menu of the plurality of software packages. Further, the computer systems software development offering method and system perform the operations of either notifying the client system when the software package is in the menu of the plurality of software packages or notifying the client system when the other software package cannot be delivered. Delivering the other software package includes sub operations of specifying that a set of contents data from the plurality of contents data in each software package in the menu of the plurality of software packages can be reused; generating index files that accommodate new content data of software packages created on demand; notifying the client system when the other software package is available for creation and delivery; notifying the client system when the other software package is being dynamically created on demand and dynamically delivered on demand to the client system; populating the other software package created dynamically; updating the dynamically created software package; updating the index of files—where updating the index files includes providing information indicating that the dynamically created software packages are created once and used many times in deploying software packages onto computer systems running the set of operating systems—and receiving from the client system a request for non-existent on demand software packages. The set of operating systems includes at least one of LINUX and UNIX operating systems. Furthermore, in delivering and/or deploying software to the client systems for installation on the set of operating systems running on the client systems, the delivering and/or the deploying further includes delivering update express service software packages through a standard repository.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings, which are meant to be exemplary, and not limiting, wherein:

DETAILED DESCRIPTION

An exemplary embodiment of a computer systems software development service offering method and system is described in detail below. The disclosed exemplary embodiment is intended to be illustrative only, since numerous modifications and variations therein will be apparent to those of ordinary skill in the art. In reference to the drawings, like numbers will indicate like parts continuously throughout the view. Further, the terms "a", "an", "first", "second" and "third" herein do not denote a limitation of quantity, but rather denote the presence of one or more of the referenced item.

Figure 1:
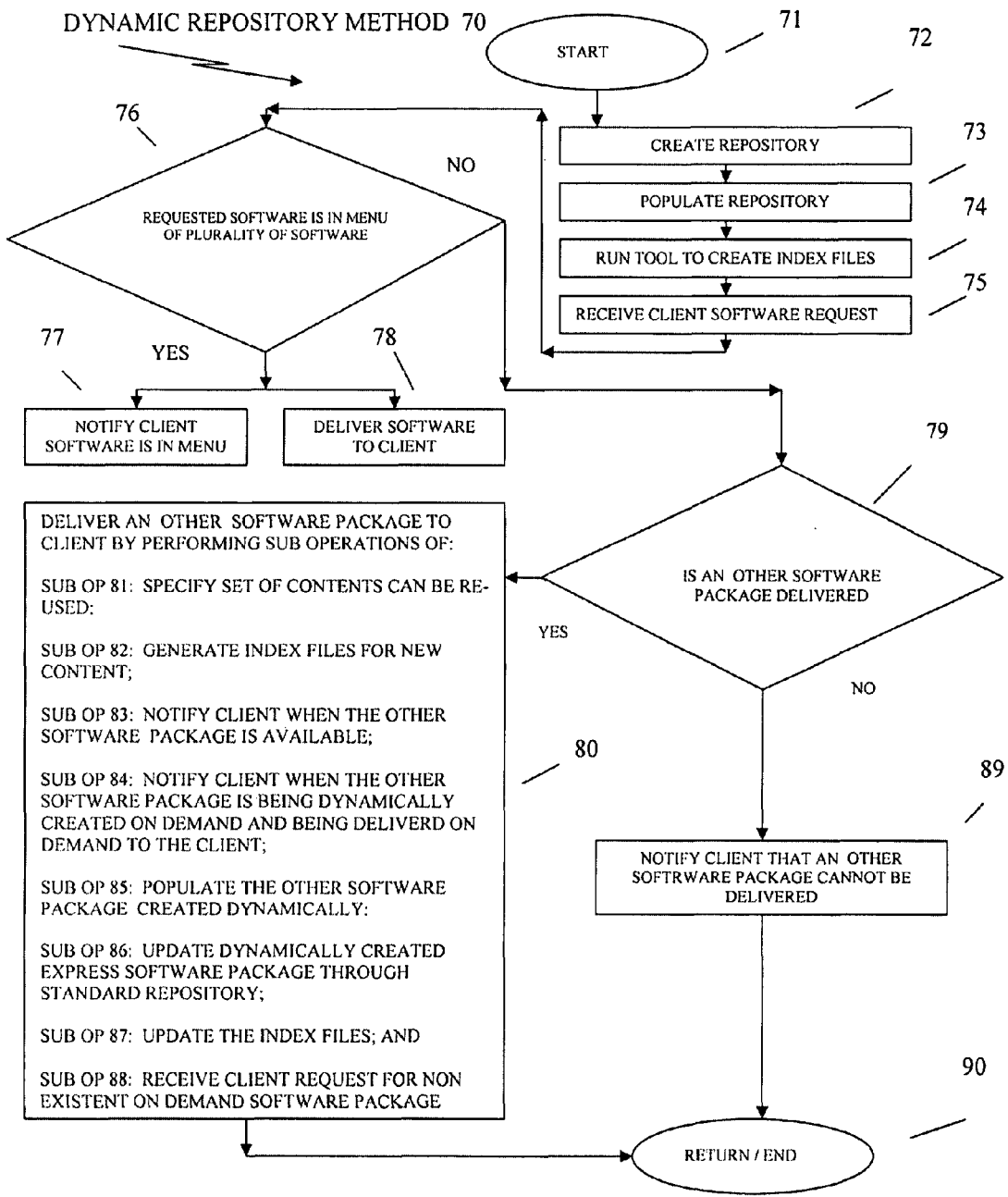
FIG. 1 illustrates a procedure for carrying out the operations of a computer systems software development service offering method (herein referred to as a "dynamic repository method"), by a provider computer processor, of creating software services and applications packages on demand for information technology (IT) solutions.
Figure 2:
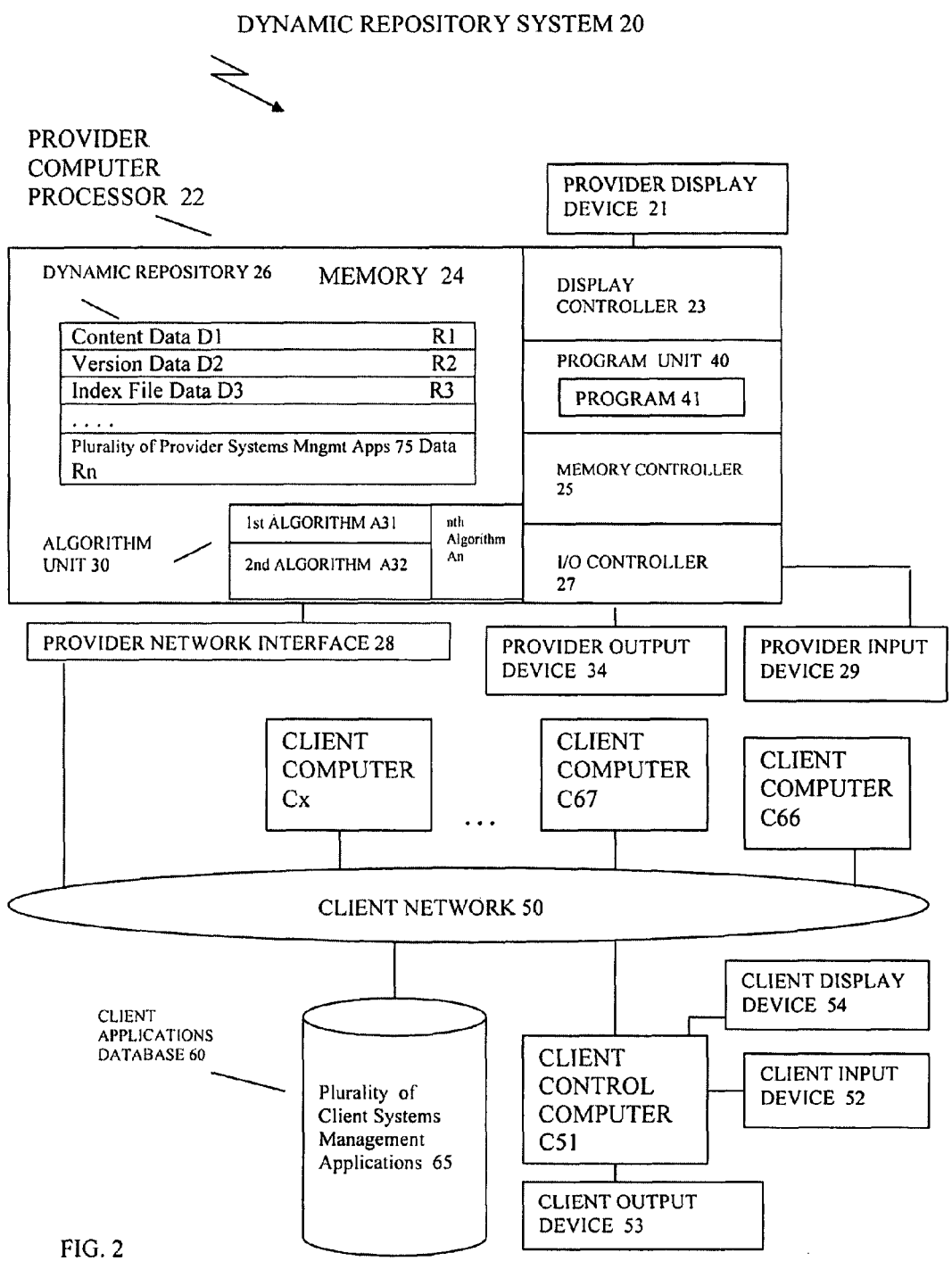
FIG. 2 illustrates a computer systems software development service offering system implementing the computer systems software development service offering dynamic repository method illustrated in FIG. 1 (where the system is herein referred to as a "dynamic offering system").

Computer systems software development service offering method (referred to herein as "dynamic repository method 70") and computer systems software development service offering system (referred to herein as "dynamic repository system 20") are illustrated in FIG. 1 and FIG. 2 respectively. Referring to FIG. 1, dynamic repository method 70 describes the exemplary operations of providing, to a client user connected in dynamic repository system 20, by a provider user of system 20, the computer systems software development service offering of creating software services and applications packages on demand for information technology (IT) solutions. Further, dynamic repository method 70 includes providing, deploying and/or installing software packages on computer systems running a set of operating systems, where the set of operating systems includes LINUX, UNIX, and any other UNIX-like operating systems.

Referring to FIG. 2, dynamic repository system 20 includes provider computer processor 22 having display controller 23, program unit 40, memory controller 25, input-output controller 27 (herein referred to as "I/O controller 27"), algorithm unit 30 and memory 24. Algorithm unit 30 contains a plurality of algorithms including a first algorithm A31, a second algorithm A32 up to an "A to the nth" algorithm (An) (i.e., third, fourth, fifth, etc. algorithms up to an infinite number of algorithms). Dynamic repository 26 resides in memory 24 and contains a plurality of repository entry locations R1 through Rn. In addition, dynamic repository 26 accommodates the storage of a plurality of provider/user systems management applications data 75 in repository entry locations, up to and including Rn. Thus, dynamic repository 26 holds the information about existing software packages, about systems and software applications the provider user has encountered before, about applications that both the provider user and client user are familiar with, about known operating system versions and about what data that projected but not-existent versions may include, about what solutions have been applied to other versions and data about what the provider user can learn lessons from and apply those lessons to current and prospective unknown versions. Dynamic repository 26 is the virtual representation of a standard repository for the provider user knowledge base; however, physically, dynamic repository 26 can be implemented in all known forms of memory devices and storage devices including hard drives and can be set up in storage appliances all over the world. Thus, the representation of dynamic repository 26 illustrated in FIG. 2 coincides with the verbal representation of dynamic repository 26 described above.

In an object-oriented approach, dynamic database repository 26 stores, in the plurality of repository entry locations R1 through Rn, each data item of a data model constructed to represent each object representing the class structure (i.e., the knowledge representation of the class structure) that supports application programming interface (API) fuzzy matching queries, in regard to non-existent LINUX kernel driver versions.

Client applications database 60 is connected to client network 50 and contains a plurality of client systems management applications 65. Provider input device 29 is connected to I/O controller 27. Client applications database 60, client control computer CSI, a plurality of client computers, i.e., client computer C66, client computer C67 through client computer Cx and provider network interface 28 are connected to client network 50. Each client systems management application of the plurality of client systems management applications 65 is available for running on any of the plurality of client computers C66 and C67 through Cx and the plurality of client computers C66 and C67 through Cx can be accessed by provider computer processor 22 via provider network interface 28, depending on a degree of access the provider user receives from the client user. In this case, client computer Cx theoretically represents an infinite number of client computers, where x equals infinity, limited only by known network physical and bandwidth capacities. The plurality of provider systems management applications 75 are accessed by provider computer processor 22 through memory controller 25. Provider input device 29 provides interaction with provider computer processor 22 by the provider user. Client control computer C51 includes client display device 54, client input device 52 and client output device 53. Client input device 52 provides interaction with provider computer processor 22 by the client user via client network 50.

Referring to FIG. 1 and FIG. 2, at operation start 71 of dynamic repository method 70, an operator/user, using provider input device 29 activates and initiates program 41, where dynamic repository method 70 is stored as executable program code on a computer executable medium. Input device 29 can be any one of a plurality input devices including any one or more of a mouse, a keyboard, a joystick, a thumb wheel, and a touch screen. The operator/user activates program 41 and performs other selections in dynamic method 70 by making entries using input device 29; thus, causing program 41 to be executed by provider computer processor 22 to perform the operations of dynamic repository method 70, thereby providing a computer systems software development service offering, of providing, deploying and installing software packages on computer systems running a set of operating systems.

At operation create repository 72 (herein referred to as "operation 72"), program 41, when executed by provider computer processor 22, causes provider computer processor 22 of dynamic repository system 20 to create a dynamic repository 26 that provides the basic infrastructure to deploy software packages on LINUX, UNIX and UNIX-like operating systems. Where dynamic repository method 70 and system 20 generate software packages, on the fly in response to the demand of the client system through client control computer C51, by reusing the content of other existing software packages. In the exemplary embodiment, a driver package built for one version of a LINUX and/or UNIX kernel can be reused by a newer version of the kernel, even when kernel versions released and/or to be released by an operating vendor are unknown. Thus, the exemplary embodiment removes the restriction on client systems of only being able to select packages available from a menu.

At operation populate repository 73 (herein referred to as "operation 73"), program 41, when executed by provider computer processor 22, causes provider computer processor 22 of dynamic repository system 20 to populate a plurality of contents of the dynamic repository 26 with data including content data D1 stored in repository entry location R1 of dynamic repository 26 and version data D2 stored in entry location R2 for deployment and installation in software packages, including a plurality of driver software packages for use in a plurality of versions of LINUX, UNIX and UNIX-like operating system kernels released by operating system vendors. The content data D1 can include, loading, installation, or plugin data, package install argument data, size, type and length data. Index file data D3 can be stored in repository entry location R3.

At operation run tool to create index files 74 (herein referred to as "operation 74"), program 41, when executed by provider computer processor 22, causes provider computer processor 22 of dynamic repository system 20 to run a tool, by calling one or more of the plurality of algorithms from algorithm unit 30, which includes first algorithm A31, second algorithm A32 up to nth algorithm An which creates a plurality of index files. The plurality of index files function in a manner similar to a menu for the client systems to select the packages they require, causing provider computer processor 22 to receive a signal from client control computer C51 requesting selected packages.

At operation receive client software request 75 (herein referred to as "operation 75"), program 41, when executed by provider computer processor 22, causes provider computer processor 22 of dynamic repository system 20 to receive a client request for a software package, selected on behalf of the client system over client network 50, by the client through client control computer C51, where the client control system C51 can request specific packages to be deployed and installed from the dynamic repository 26, where the specific packages are installed on the plurality of client computers C66, C67 up to Cx.

At operation requested software is in menu of plurality software 76 (herein referred to as "operation 76"), program 41, when executed by provider computer processor 22, causes provider computer processor 22 of dynamic repository system 20 to determine whether the software package requested by client control computer C51 is in the menu and/or is available, through an application programming interface (API) call, directed to accessing, by either the operator/user of dynamic system 20 or the client control computer C51, the index files created in operation 74.

When provider computer processor 22 determines that the software package requested by client control computer C51 is in the menu and/or is available, through an API call, from the index files created in operation 74 (YES), then program 41 causes provider computer processor 22 to perform operation notify client software is in menu 77 (herein referred to as "operation 77") and causes provider computer processor 22 to perform operation deliver software to client 78 (herein referred to as "operation 78").

At operation 77, program 41 causes provider computer processor 22 to notify client control computer C51 that the software selected by client computer C51 is either in the menu and/or is available through an API call directed to the index files created in operation 74. The notification can be transmitted by provider computer processor 22 and received by client control computer C51 by one or more electrical, electronic and/or physical modes of transmitting and receiving, including audio indicators including speakers, visual indicators including display screens, such as client display device 54 and LEDs, including provider computer processor 22 transmitting the notification in response to receiving a signal from client input device 52 accessing an Internet file over client network 50, including electronic mail devices, and/or scanned documents sent via facsimile over client network 50.

At operation 78, program 41 causes provider computer processor 22 to deliver a software package selected by client control computer C51, based on a selection signal transmitted by client control computer C51 and said selection signal being received by provider computer processor 22 over client network 50. The software package selected by client control computer C51 can be transmitted by provider computer processor 22 and received by client control computer C51 by one or more electrical, electronic and/or physical modes of transmitting and receiving, including audio indicators including speakers, visual indicators including display screens, such as client display device 54, including provider computer processor 22 transmitting the software package in response to receiving a signal from client input device 52 accessing an Internet file over client network 50, including electronic mail devices, and/or scanned documents sent via facsimile over client network 50.

When provider computer processor 22 determines that the software package requested by client control computer C51 is not in the menu and/or is not available, through an API call, directed to the index files created in operation 74 (i.e., NO), then program 41 causes provider computer processor 22 to determine, at operation is an other software package delivered 79 (herein referred to as "operation 79"), whether or not an other software package can be delivered to the client system, i.e., to client control computer C51. When provider computer processor 22 determines at operation 79 that an other software package can be delivered (YES), then program 41, causes provider computer processor 22 to deliver an other software package to client control computer C51.

At operation deliver an other software package to client by performing sub operations: 80 (herein referred to as "operation 80"), program 41 causes provider computer processor 22 to deliver an other software package to client control computer C51 by performing sub operations 81 through 88.

At sub operation 81, program 41 causes provider computer processor 22 to specify that the content data D1 of a software package can be reused; thus, program 41 causes provider computer processor 22 to retrieve applicable content data D1 from dynamic repository 26 and from that data generated for the an other package on demand, from client control computer C51, by reusing the content data D1 of existing packages, where the content data D1 of existing packages are stored in dynamic repository 26.

At sub operation 82, program 41 causes provider computer processor 22 to run an index creation tool, by calling one or more of the plurality of algorithms from algorithm unit 30, create a plurality of index files containing index file data D3 stored in repository entry location R3 of dynamic repository 26 that represent an other non-existent packages, where the other non-existent packages represented, however, can be created on demand by reusing content data D1 of existing packages combined with index file data D3.

At sub operation 83, program 41 causes provider computer processor 22 to notify client control computer C51 when the other software packages known to be non-existent are available and can be supplied on demand by dynamic repository system 20. The notification can be transmitted by provider computer processor 22 and received by client control computer C51 by one or more electrical, electronic and/or physical modes of transmitting and receiving, including audio indicators including speakers, visual indicators including display screens, such as client display device 54 and LEDs, including provider computer processor 22 transmitting the notification in response to receiving a signal from client input device 52 accessing an Internet file over client network 50, including electronic mail devices, and/or scanned documents sent via facsimile over client network 50.

At sub operation 84, program 41 causes provider computer processor 22 to notify client control computer C51 that the other software packages advertised as known to be non-existent are now being dynamically created and delivered on demand to client control computer C51. The notification can be transmitted by provider computer processor 22 and received by client control computer C51 by one or more electrical, electronic and/or physical modes of transmitting and receiving, including audio indicators including speakers, visual indicators including display screens, such as client display device 54 and LEDs, including provider computer processor 22 transmitting the notification in response to receiving a signal from client input device 52 accessing an Internet file over client network 50, including electronic mail devices, and/or scanned documents sent via facsimile over client network 50.

At sub operation 85, program 41 causes provider computer processor 22 to populate the dynamically created other software package, including populating the other software package with content data from dynamic repository 26. The content data can include, loading, installation, or plugin data, package install argument data, size, type and length data.

At sub operation 86, program 41 causes provider computer processor 22 to perform updating of the one or more dynamically created other software package and/or packages in a manner that causes these dynamically created other software packages to be delivered as updated express software packages delivered through a standard repository that can accommodate and store non-standard and/or non-existent data by creating content data D1 by combining existing content data D1, version data D2 and index file data D3 in dynamic repository 26 through fuzzy matching selections conducted by provider computer processor 22.

At sub operation 87, program 41 causes provider computer processor 22 to perform updating of the index file data D3 of index files representing the one or more dynamically created other software package and/or packages in a manner that causes these dynamically created other software packages to be created once and used many times.

At sub operation 88, program 41 causes provider computer processor 22 to receive from client control computer C51 additional requests for non-existent on demand software packages.

At operation return/end 90, dynamic repository method 70 and system 20 can be directed by program 41 to either return to any of the above operations and/or sub operations to continue iteratively processing and performing said operations and sub operations for a plurality of existent and non-existent software application packages or directed by program 41 to end all operations and sub operations of method 70 and system 20.

When dynamic repository method 70 and system 20 are directed by program 41 to return to any of the above operations and/or sub operations to continue iteratively processing and when at operation 79, provider computer processor 22 determines that there is not an other software package that can be delivered to client control computer C51 (NO), then at operation notify client control computer C51 that an other software package cannot be delivered 89 (herein referred to as "operation 89"), program 41 causes provider computer processor 22 to notify client control computer C51 that any other software package cannot be created and delivered and then dynamic repository method 70 and system 20 ends all operations and sub operations and operation return/end 90.

Control database repository 26 contains a plurality of repository entry locations R1 through Rn. In addition, control database repository 26 accommodates the storage of a plurality of provider user systems management application data 75 in repository entry locations, up to repository entry location Rn. Thus, control database repository 26 holds data about problems that have already been solved, about operating systems the provider/user has encountered before, about systems that both the provider user and client user are familiar with, about known version data D2 and about what solutions have been applied to other operating systems software problems before, that the provider user can learn lessons from and apply those lessons to current and prospective unsolved computer operating systems version management problems. Control database repository 26 is the virtual representation of a standard repository for the provider user knowledge base; however, physically, control database repository 26 can be implemented in all known forms of memory devices and storage devices including hard drives and can be set up in storage appliances all over the world. Thus, the representation of control database repository 26 illustrated in FIG. 2 coincides with the verbal representation of control database repository 26 described above.

In an object-oriented approach, control database repository 26 stores, in the plurality of repository entry locations R1 through Rn, each data item of a data model constructed to represent each object representing the class structure (i.e., the knowledge representation of the class structure) that supports application programming interface (API) fuzzy matching queries.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular exemplary embodiment disclosed as the best mode contemplated for carrying out this disclosure, but that the disclosure will include all embodiments falling within the scope of the appended claims.

What is claimed is:

1. A computer systems software development service offering method, by a provider computer processor, of providing software packages, the computer systems software development service offering method comprising:

running a tool that creates a set of index files, wherein the set of index files includes a menu of a plurality of software packages, the plurality of software packages including a first software package built for a first version of an operating system;

receiving, from a client system running a second version of the operating system, a selection request for a second software package built for the second version of the operating system;

determining, by the provider computer processor, that the second software package requested from the client system is not included in the menu of the plurality of software packages;

sending a first notification to the client system that the second software package requested from the client system is not available but can be supplied on demand;

in response to determining that the second software package corresponding to the second version of the operating system is not included in the menu of the plurality of software packages, dynamically creating, a third software package on the fly based on receiving the selection request, the dynamically creating comprising:
sending a second notification to the client system indicating that the third software package, in place of the second software package, is now being dynamically created on demand, such that the second notification includes an audio indicator and a visual indicator;
retrieving an applicable reusable content from the first software package built for the first version of the operating system; and
generating a new set of index files containing new index file data in the menu in which the new index file data represents the third software package built for the second version of the operating system, wherein the new index file data represents that the third software package for the second version can be created on demand by reusing the applicable reusable content of the first software package for the first version of the operating system;
delivering to the client system the third software package; and
populating a repository with the third software package.

2. The computer systems software development service offering method, according to claim 1, wherein the operating system includes multi-tasking.

3. The computer systems software development service offering method, according to claim 2, wherein delivering to the client system further includes delivering update express service software packages through a standard repository.

4. A computer systems software development service offering system for providing software packages, the computer systems software development service offering system comprising:
a provider computer processor associated with a program unit and a repository, wherein the provider computer processor is cooperatively coupled to a client computer;
a computer executable program residing in the program unit, wherein the computer executable program when executed by the provider computer processor causes the provider computer processor to:
run a tool that creates a set of index files, wherein the set of index files includes a menu of a plurality of software packages in the repository, the plurality of software packages including a first software package built for a first version of an operating system;
receive, from a client system running a second version of the operating system, a selection request for a second software package built for the second version of the operating system;
determine that the second software package is not included in the menu of the plurality of software packages requested from the client system;
sending a first notification to the client system that the second software package requested from the client system is not available but can be supplied on demand;
in response to determining that the second software package corresponding to the second version of the operating system is not included in the menu of the plurality of software packages, dynamically create, a third software package on the fly based on receiving the selection request, the dynamically creating comprising:
send a second notification to the client system indicating that the third software package, in place of the second software package, is now being dynamically created on demand, such that the second notification includes an audio indicator and a visual indicator;
retrieve an applicable reusable content from the first software package built for the first version of the operating system; and
generate a new set of index files containing new index file data in the menu in which the new index file data represents the third software package built for the second version of the operating system, wherein the new index file data represents that the third software package for the second version can be created on demand by reusing the applicable reusable content of the first software package for the first version of the operating system;
deliver to the client system the third software package; and
populate the repository with the third software package.

5. The computer systems software development service offering system, according to claim 4, wherein the operating system multi-tasking.

6. The computer systems software development service offering system, according to claim 5, wherein delivering to the client system further includes delivering update express service software packages through a standard repository.

7. The computer systems software development service offering method, according to claim 1, the method further comprising combining the applicable content of the first software package with version data.

8. The computer systems software development service offering method, according to claim 7, the method further comprising combining the applicable content of the first software package with index file data.

9. The computer systems software development service offering method, according to claim 8, the method further comprising performing a fuzzy matching query.

10. The computer systems software development service offering method, according to claim 9, wherein the second version of the operating system is newer than the first version.

11. The computer systems software development service offering method, according to claim 10, wherein the applicable content from the first software package includes at least one selected from loading data, installation data, plugin data, package install argument data, size data, type data and length data.

12. The computer systems software development service offering method, according to claim 11, wherein the repository further includes information about known operating system versions, information about projected operating system versions, and solutions applied to previous operating system version management problems.

13. The computer systems software development service offering method, according to claim 12, wherein the second software package is not available.

14. The computer systems software development service offering method, according to claim 12, wherein the second software package is non-existent.

15. The computer systems software development service offering method, according to claim 12, wherein the first software package is a driver for a device and the third software package is a dynamically created driver for the device.

16. The computer systems software development service offering method, according to claim 12, the method further comprising:
creating a repository, by the provider computer processor; and
populating the repository with a plurality of software packages.

17. The computer systems software development service offering system, according to claim 4, wherein the computer executable program when executed by the provider computer processor further causes the provider computer processor to perform a fuzzy matching query.

18. The computer systems software development service offering system, according to claim 4, wherein the second version of the operating system is newer than the first version.

19. The computer systems software development service offering system, according to claim 4, wherein the applicable content from the first software package includes at least one selected from loading data, installation data, plugin data, package install argument data, size data, type data and length data.

20. The computer systems software development service offering system, according to claim 4, wherein the repository further includes information about known operating system versions, information about projected operating system versions, and solutions applied to previous operating system version management problems.

\* \* \* \* \*